US008544946B2

(12) United States Patent
Holden

(10) Patent No.: US 8,544,946 B2

(45) Date of Patent: Oct. 1, 2013

(54) TREE AND POST REMOVER

(76) Inventor: William R. Holden, Sumrall, MS (US)

( * ) Notice: Subject to any disclaimer, the term of this patent is extended or adjusted under 35 U.S.C. 154(b) by 246 days.

(21) Appl. No.: 12/963,517

(22) Filed: Dec. 8, 2010

(65) Prior Publication Data

US 2011/0148131 A1 Jun. 23, 2011

Related U.S. Application Data

(60) Provisional application No. 61/282,149, filed on Dec. 22, 2009.

(51) Int. Cl.
*B62J 1/24* (2006.01)

(52) U.S. Cl.
USPC .............................. 297/197; 254/30; 414/729

(58) Field of Classification Search
USPC .............. 294/103.1, 197; 414/723, 729, 732, 414/739; 254/29 R, 30, 31, 131, 132; 37/302
See application file for complete search history.

(56) References Cited

U.S. PATENT DOCUMENTS

| | | | | |
|---|---|---|---|---|
| 2,482,950 A | | 9/1949 | Toftey | |
| 2,505,923 A | | 5/1950 | Taylor et al. | |
| 2,662,729 A | | 12/1953 | Fountain | |
| 3,057,599 A | | 10/1962 | Clatterbuck | |
| 3,110,477 A | | 11/1963 | Campbell | |
| 3,208,726 A | | 9/1965 | Dowell | |
| 4,226,402 A | * | 10/1980 | Muth | 254/30 |
| 4,256,286 A | | 3/1981 | Hudgins | |
| 4,266,819 A | * | 5/1981 | Pemberton | 294/197 |
| 5,211,374 A | * | 5/1993 | Head et al. | 254/30 |
| 5,242,152 A | * | 9/1993 | Schatz | 254/30 |
| 5,503,201 A | | 4/1996 | Strickland et al. | |
| 5,526,637 A | * | 6/1996 | Leonard | 56/16.4 R |
| 6,010,294 A | | 1/2000 | Lyddon | |
| 6,382,594 B1 | | 5/2002 | Ransom | |
| 6,857,619 B1 | | 2/2005 | Jangula | |
| 2003/0031547 A1 | | 2/2003 | Stumvoll et al. | |
| 2008/0181756 A1 | | 7/2008 | Moffitt | |

OTHER PUBLICATIONS

Website, http://www.wikco.com/treeplr.html, model 200-30 Post and Tree Puller, seven sheets printed from the internet on Oct. 18, 2009.

* cited by examiner

*Primary Examiner* — Stephen Vu
(74) *Attorney, Agent, or Firm* — Richard C. Litman

(57) ABSTRACT

The tree and post remover is a removably attachable accessory for an operating vehicle, such as a skid-steer machine, tractor, or similar working machine having hydraulic power output. The tree and post remover has a mounting plate having a fixed jaw assembly extending therefrom and a movable jaw assembly captured and sliding laterally within the fixed jaw assembly. A hydraulic strut resides within the movable jaw assembly, and has one end attached to the movable jaw assembly and its opposite end attached to the fixed jaw assembly. Actuation of the hydraulic strut drives the movable jaw assembly toward or away from the fixed jaw assembly to close or open the jaws relative to one another. Each jaw assembly preferably includes a plurality of individual jaw members, opposite jaw members meshing with one another to allow the jaws to close upon objects of relatively small diameter.

8 Claims, 6 Drawing Sheets

TREE AND POST REMOVER

CROSS-REFERENCE TO RELATED APPLICATION

This application claims the benefit of U.S. Provisional Patent Application Ser. No. 61/282,149, filed Dec. 22, 2009.

BACKGROUND OF THE INVENTION

1. Field of the Invention

The present invention relates generally to powered machinery used for landscaping, construction, and the like, and particularly to a tree and post remover that provides a hydraulically actuated attachment for tractors, skid-steer vehicles, and the like, for removing trees, posts, poles, and the like from the ground.

2. Description of the Related Art

Prior to the development of powered machinery, the removal of articles embedded in the ground (especially trees, brush, and other natural objects having root structures) required considerable manual labor if the article was to be removed in its entirety, as opposed to merely cutting it off at the surface. The development of powered machinery to assist in the removal of trees, posts, poles, and other articles embedded in the ground, has greatly facilitated such projects.

The development of such powered machinery was generally directed to relatively large equipment for clearing relatively large areas, with the equipment being capable of removing relatively large diameter trees, posts, poles, and the like. As power systems (particularly auxiliary hydraulic systems) became more compact and efficient, such devices were developed for smaller equipment, e.g., tractors, skid-steer machines, etc. In fact a great many different hydraulically powered attachments have been developed for use on skid-steer machines, as well as tractors and other utility vehicles, some of which are adapted for pulling or removing trees, brush, posts, etc. from the ground.

The present inventor is aware of certain such devices that have been developed in the past, using different principles of operation. Some such devices are not pullers or extractors, but rather rely upon hydraulic power to drive a pair of opposed blades together to cut or shear the object, leaving the remainder of the object in the ground. Others actually pull the object from the ground, but use different mechanical principles, such as pivoting jaws and multiple hydraulic systems.

Thus, a tree and post remover solving the aforementioned problems is desired.

SUMMARY OF THE INVENTION

The tree and post remover comprises an accessory for a skid-steer machine, tractor, or other similar operating vehicle having hydraulic power output. The tree and post remover is removably attachable to such machines by means of the standard, conventional attachment fixtures provided with such machines. The attachment or backing plate includes a fixed jaw structure extending forwardly therefrom and a movable jaw structure captured and sliding laterally within the fixed jaw structure. A hydraulic strut actuator resides within the movable jaw structure, and has one end connected to the movable jaw structure and an opposite end connected to the fixed jaw structure. Actuation of the hydraulic strut drives the movable jaw structure toward or away from the fixed jaw structure to close or open the two jaws relative to one another.

Each jaw structure preferably includes a plurality of individual jaw members, each of the members preferably having a concave, semicircular internal radius or gripping edge to conform more accurately to the usual circular cross-sectional shape of a tree and/or most poles and posts. The gripping edge or internal radius of each jaw member includes a plurality of teeth extending therefrom for better grip of an object grasped therein. One side (e.g., the fixed jaw side) preferably includes one more jaw member than the opposite side. In this manner, the jaw members of the side having fewer members may be aligned with the spaces between the opposite jaw members, thereby allowing the overlapping portions of the fixed and movable jaw members to pass between one another. This allows the concavities of the opposing jaw members to approach one another more closely, thereby allowing the device to grasp smaller diameter trees, posts, and poles for their removal.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The tree and post remover is a device for removing trees, posts, poles, and the like from their placement in the ground. The tree and post remover is configured for removable attachment to a skid-steer machine, tractor, or other conventional operating vehicle having conventional hydraulic power available for accessories. The movable jaw assembly of the tree and post remover is hydraulically actuated from the operating vehicle, by the hydraulic system of the vehicle.

Figure 1:
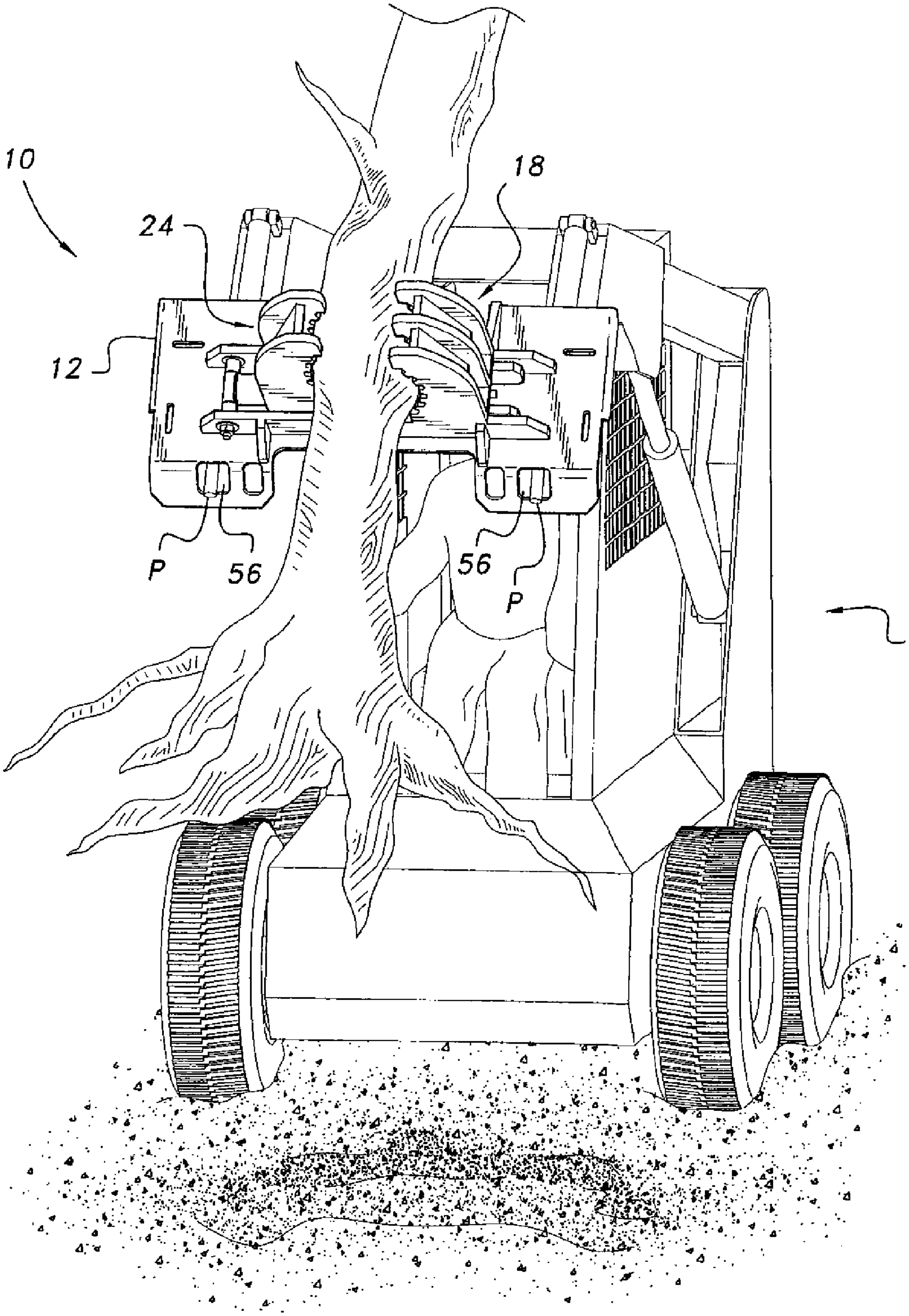
FIG. 1 is an environmental, perspective view of a tree and post remover according to the present invention, showing the device operatively installed on a skid-steer vehicle.

FIG. 1 is an environmental front perspective view of a conventional skid-steer machine or vehicle V having the tree and post remover 10 mounted thereon. The tree and post remover 10 may be adapted for removable attachment to a conventional tractor or the like having a three-point hitch attachment, or to other suitable operating vehicles as desired. All such vehicles conventionally include a hydraulic system and means for providing hydraulic power to various accessories and attachments when installed, e.g., loading buckets for skid-steer machines, etc., and the tree and post remover 10 makes use of such conventional vehicle hydraulic power for its operation.

Figure 2:
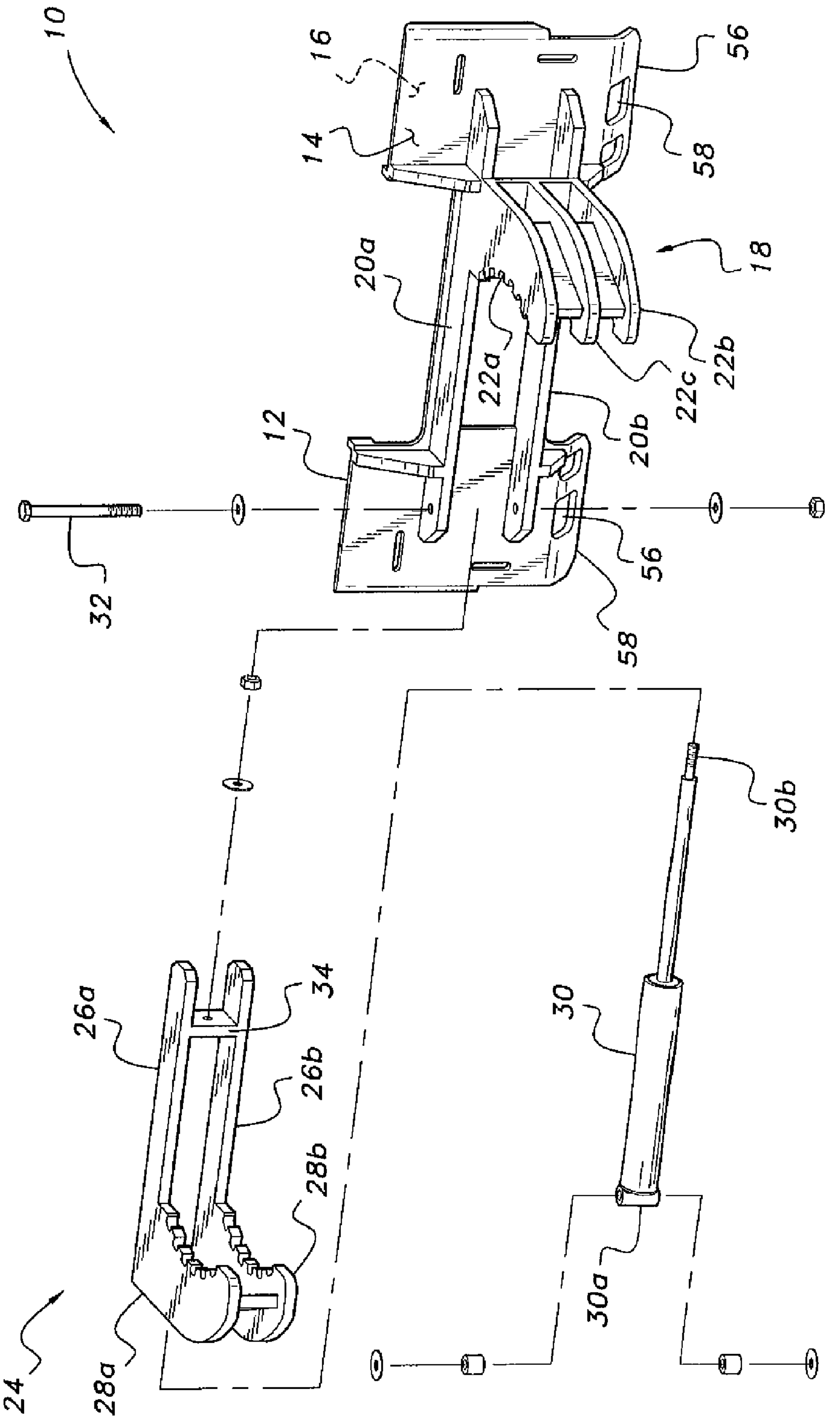
FIG. 2 is an exploded perspective view of the components of the tree and post remover according to the present invention, showing details and assembly thereof.

FIG. 2 provides an exploded perspective view of the tree and post remover 10, illustrating its various components. The tree and post remover 10 includes a mounting plate 12, with the plate 12 serving as an attachment device for removably securing the tree and post remover 10 to the operating vehicle V as well as serving as a base for the attachment of other components. The mounting plate 12 has a front side 14 to which the other components of the device are attached, and an opposite rear side 16 (seen in edge view in FIGS. 3 and 5) that includes structure for removably securing the tree and post remover 10 to the operating vehicle V.

A fixed jaw assembly 18 is permanently and immovably affixed (e.g., welded) to the front side 14 of the mounting plate 12. The fixed jaw assembly includes elongate, parallel upper and lower guides, respectively 20*a* and 20*b*, that extend laterally across the front side 14 of the mounting plate 12. Each of the guides 20*a*, 20*b* is preferably formed of heavy steel plate and includes a fixed jaw member, respectively 22*a* and 22*b*, formed integrally therewith and extending outwardly therefrom, with there preferably being a third fixed jaw member 22*c* therebetween.

A movable jaw assembly 24 includes elongate, parallel upper and lower slides, respectively 26*a* and 26*b*, that slide laterally between the upper and lower guides 20*a*, 20*b* of the fixed jaw assembly 18. Each of the movable jaw slides 26*a*, 26*b* is preferably formed of heavy steel plate and includes a movable jaw member, respectively 28*a* and 28*b*, formed integrally therewith and extending outwardly therefrom and generally laterally opposite the fixed jaw members 22*a* through 22*c* when the movable jaw assembly 24 is installed within the upper and lower guides 20*a*, 20*b* of the fixed jaw assembly 18.

An actuator 30 is installed between the two slides 26*a* and 26*b*, to drive the movable jaw assembly 24 laterally across the front side 14 of the plate 12 relative to the fixed jaw members 22*a* through 22*c*. The actuator 30 is preferably a conventional double acting telescoping hydraulic strut having a first or cylinder base end 30*a* pivotally attached between the distal ends of the two guides 20*a*, 20*b* of the fixed jaw assembly 18 by a bolt or pin 32, and an opposite rod end 30*b* affixed to an attachment web 34 that is in turn affixed between the two guides 20*a*, 20*b* adjacent the upper and lower fixed jaw members 22*a*, 22*b* extending therefrom. Alternative actuation means may be provided as desired, e.g., a hydraulically or electrically driven threaded screw jack assembly, etc.

Figure 3:
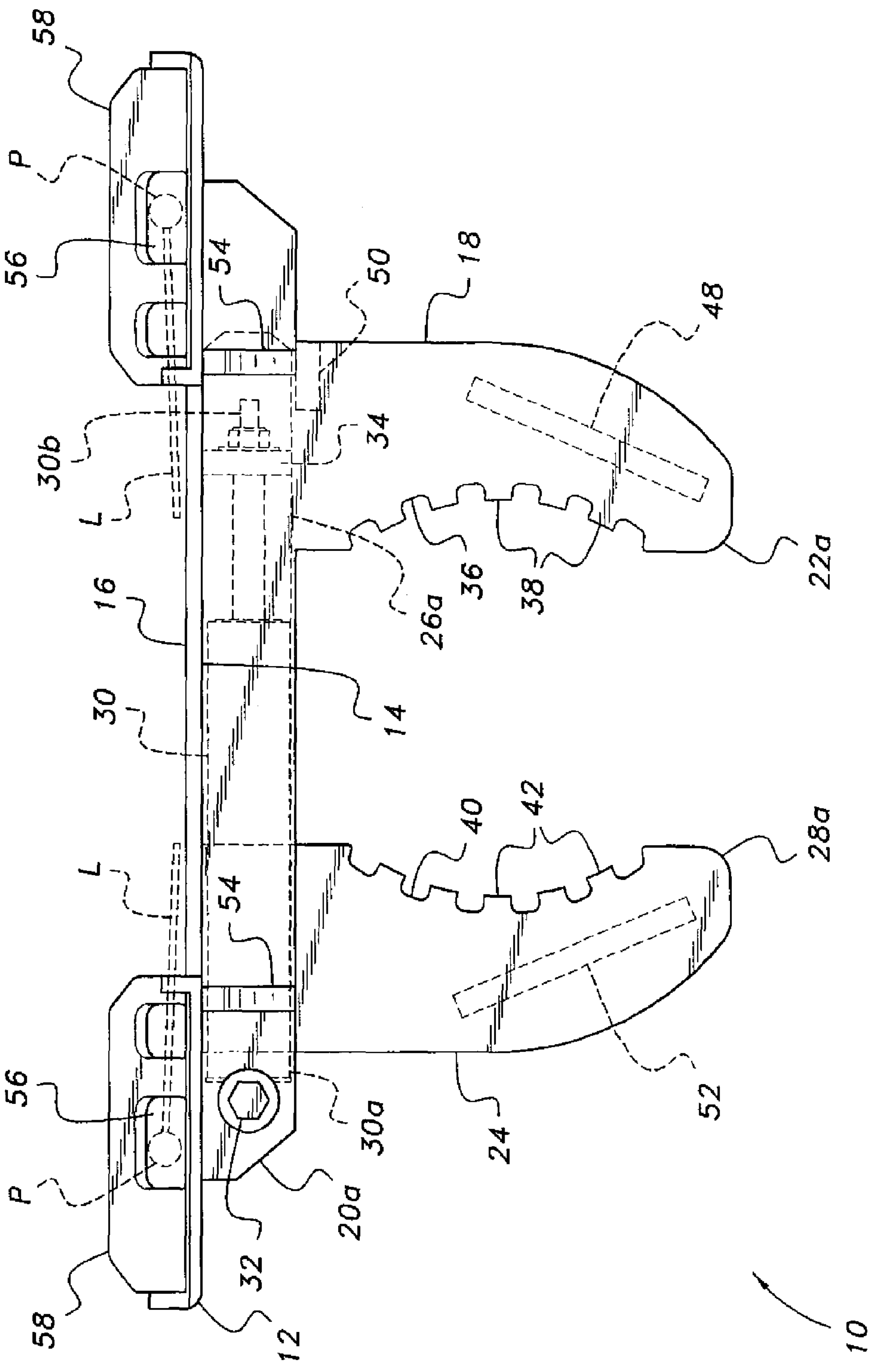
FIG. 3 is a top plan view of the tree and post remover according to the present invention, showing the jaws open.

FIG. 3 provides a top plan view of the tree and post remover 10 showing the two jaw assemblies 18 and 24 open, i.e., with the fixed jaw members 22*a* through 22*c* and the movable jaw members 28*a* and 28*b* spread apart from one another. This configuration results when the actuator 30 is operated to retract the rod and its end 30*b* to the left in FIGS. 3 and 4. As the cylinder base end 30*a* of the actuator 30 is immovably affixed relative to the mounting plate 12 and fixed jaw assembly 18, the retraction of the rod and rod end 30*b* to the left (in FIGS. 3 and 4) draws the movable jaw assembly 24 to the left as well, thereby moving the jaws 28*a* and 28*b* to the left and away from the fixed jaws 22*a* through 22*c*.

The fixed jaw members 22*a* through 22*c* and the movable jaw members 28*a* and 28*b* each have gripping edges configured particularly for gripping objects having generally circular cross sections, such as trees and most poles and posts, although they are quire capable of gripping objects having other shapes as well. In the top plan view of FIG. 3 only the uppermost fixed jaw member 22*a* and uppermost movable jaw member 28*a* of the various jaw members are visible, but it will be understood that all of the fixed jaw members are essentially identical to one another, as are both of the movable jaw members. The fixed jaw members 22*a* through 22*c* are each formed with an arcuately concave gripping edge 36 having a plurality of teeth 38 extending therefrom, with the movable jaw members 28*a*, 28*b* being similarly configured with concave gripping edges 40 and teeth 42.

Figure 4:
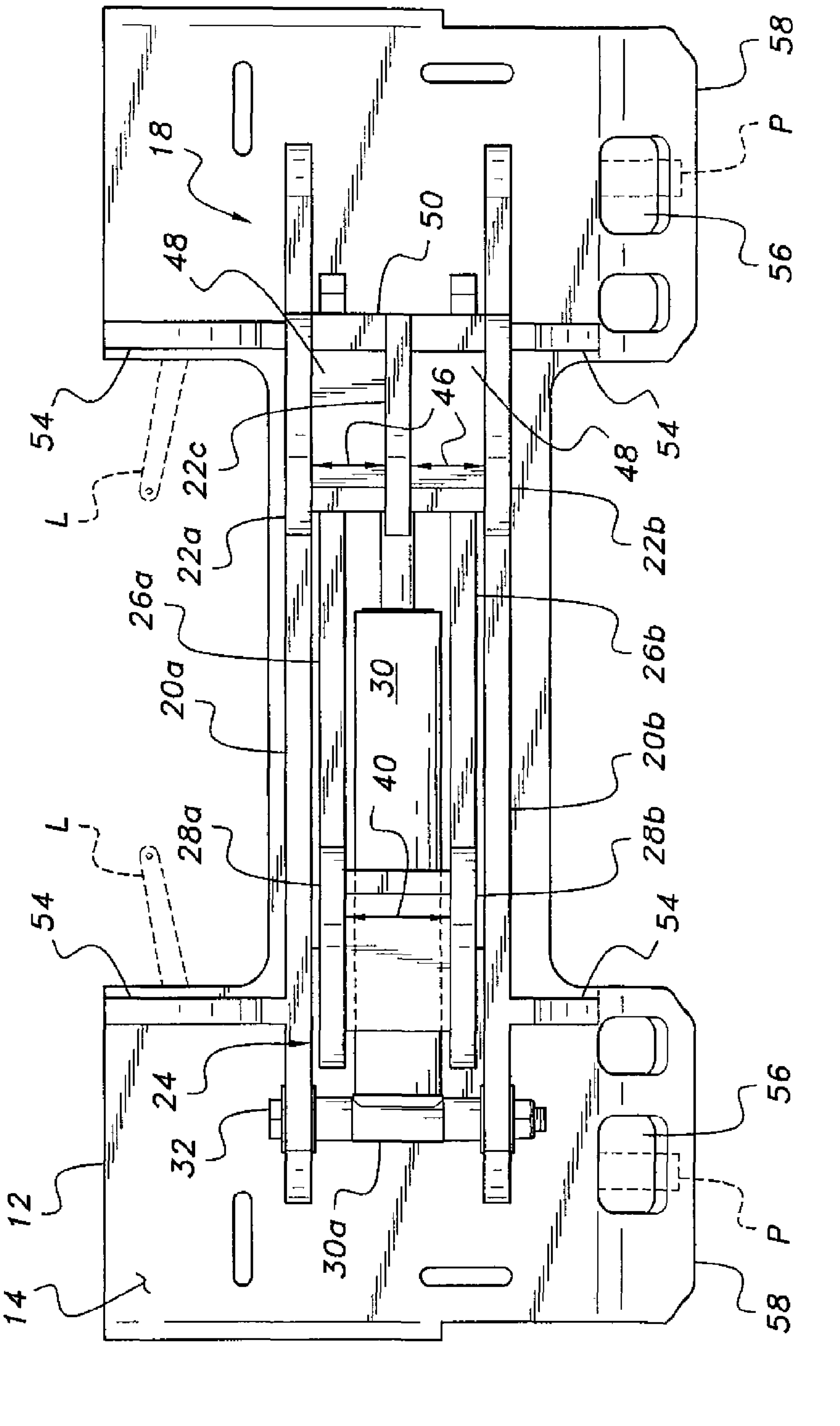
FIG. 4 is a front elevation view of the tree and post remover according to the present invention with its jaws open.

FIG. 4 is a front elevation view of the tree and post remover 10 with the jaws open as shown in FIG. 3, to show further details. The two jaw members 28*a*, 28*b* of the movable jaw assembly 24 are not coplanar with the upper and lower jaw members 22*a* and 22*b* of the fixed jaw assembly. This is due to the movable jaw members 28*a*, 28*b* being extensions of the plates comprising the two slides 26*a*, 26*b* of the movable jaw assembly 24, with the two movable jaw members 28*a*, 28*b* being separated by a gap 44 corresponding to the spacing provided between the two slides 26*a*, 26*b* to house the actuator 30 therebetween.

Similarly, the upper and lower fixed jaw members 22*a*, 22*b* are extensions of their respective guide plates 20*a* and 20*b*, which plates are separated from one another by a gap sufficient to allow the slides 28*a*, 28*b* of the movable jaw assembly 24 to slide therebetween. This gap or space provides sufficient room for the third intermediate fixed jaw member 22*c*, with fixed jaw members 22*a*, 22*c* and 22*b*, 22*c* being separated by gaps 46. The movable jaw members 28*a*, 28*b* are actually aligned with these two gaps 46 between the fixed jaw members 22*a* through 22*c*, thus allowing portions of the fixed jaw members and movable jaw members to overlap one another slightly when the jaws are completely closed, as shown in FIGS. 5 and 6.

The gaps 46 between the three fixed jaw members 22*a* through 22*c* are established by the thicknesses of the plates forming the jaw members and the guides 20*a*, 20*b*, and their separation from one another. Their separation is established by their attachment to the mounting plate 12, with additional rigidity provided by spacer plates 48 between the fixed jaw members 22*a* through 22*c*. An additional spacer plate 50 is provided at the bases of the fixed jaw members, with this plate 50 also serving as a retainer to hold the two slides 26*a*, 26*b* between the two guides 20*a* and 20*b*. Similarly, the slides 26*a*, 26*b* and jaw members 28*a*, 28*b* of the movable jaw assembly are held in rigid relationship to one another by a spacer plate 52 therebetween, with the opposite distal ends of the slides 26*a*, 26*b* being spaced from one another by the rod end attachment web 34 therebetween. Additional attachment security for the fixed jaw assembly 18 may be provided by a series of upper and lower gussets or braces 54 normal to the mounting plate 12 and guides 20*a*, 20*b*.

Figure 5:
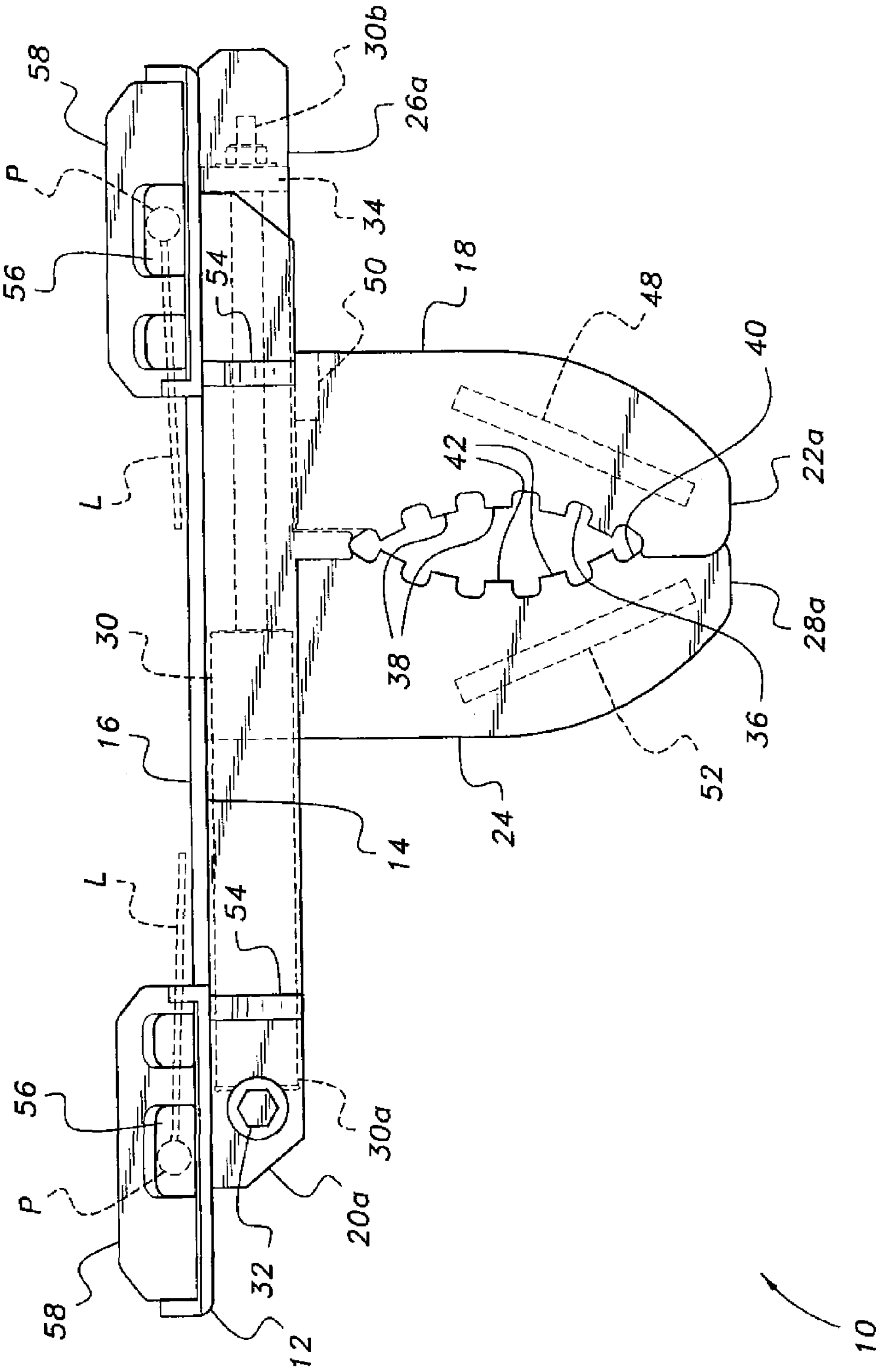
FIG. 5 is a top plan view of the tree and post remover according to the present invention, showing the jaws closed.
Figure 6:
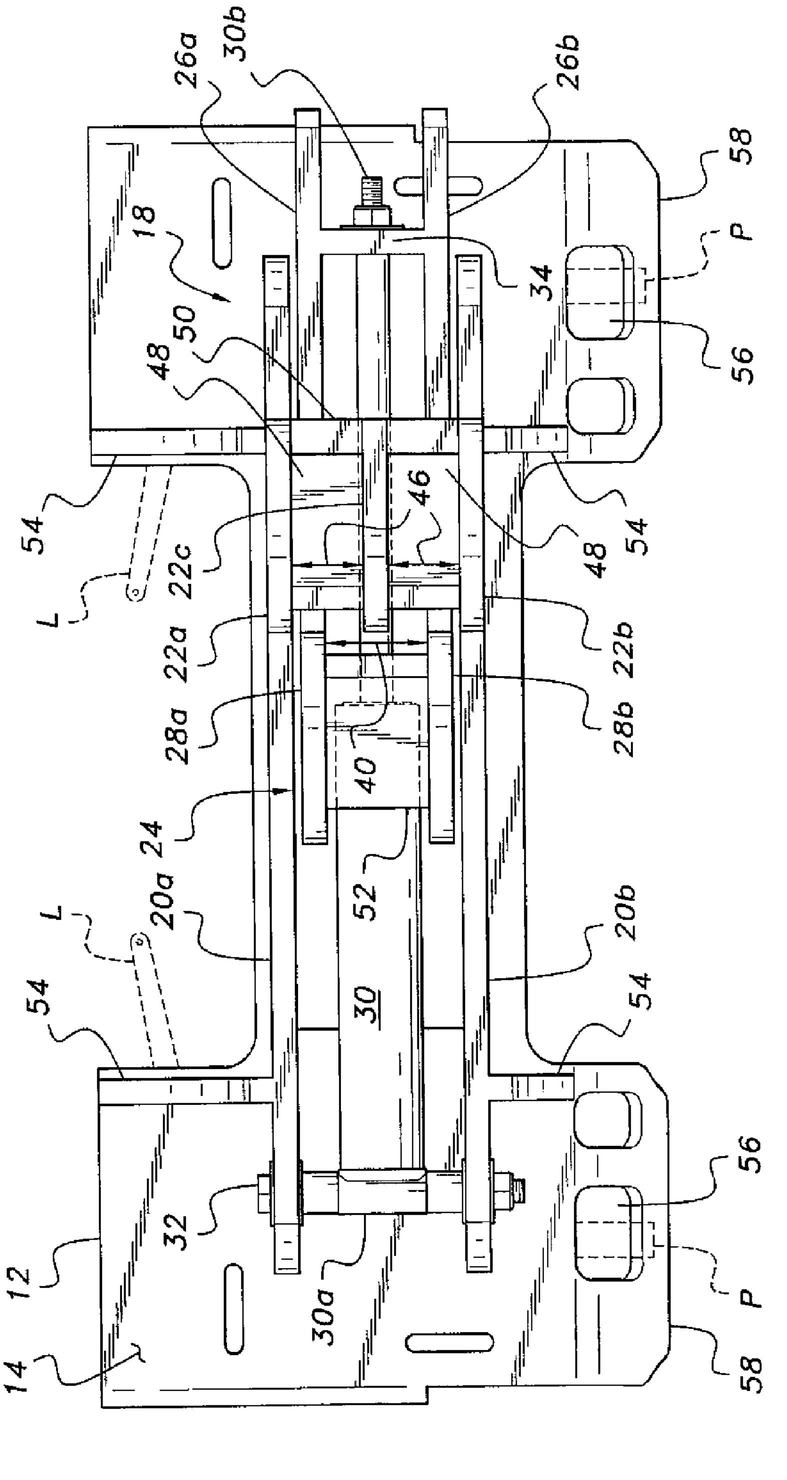
FIG. 6 is a front elevation view of the tree and post remover according to the present invention with its jaws closed.

FIGS. 5 and 6 of the drawings are similar to FIGS. 3 and 4, but respectively show a top plan view and a front elevation view of the tree and post remover 10 with the jaws closed. This is accomplished by providing hydraulic power to the actuator 30 to extend the strut, moving the distal rod end 30*b* away from the cylinder base end 30*a*. As the cylinder base end 30*a* is captured immovably between the distal ends of the two guides 20*a* and 20*b*, the actuator will force the two slides 26*a*, 26*b* to move to the right by means of the attachment of the rod end 30*b* to the rod end attachment web 34 affixed between the distal ends of the slides 26*a*, 26*b*. As the movable jaw members 28*a*, 28*b* are extensions of the slides, the two movable jaw members 28*a*, 28*b* will close upon the fixed jaw members 22*a* through 22*c*, or more accurately, will close toward the gaps 46 between those fixed jaw members. The result is essentially as shown in FIG. 6, if no object is placed between the fixed and movable jaw members to impede the closure of the fixed jaw members.

The tree and post remover 10 may be adapted or configured for removable attachment to a wide variety of different operating vehicles, as noted further above. The exemplary mounting plate 12 described herein provides removable attachment to a skid steer machine similar to that illustrated in FIG. 1. One type of attachment means used with such machines comprises vertical pins P actuated by levers L (shown in broken lines in FIGS. 3 through 6), with the pins P extending through passages 56 in the rearwardly angled lower edge 58 of the mounting plate 12. The completed assembly of the tree and post remover 10 to the operating vehicle V, and the operation of the vehicle V and tree and post remover 10 in the removal of a tree from its site in the ground, are shown generally in FIG. 1 of the drawings.

It is to be understood that the present invention is not limited to the embodiment described above, but encompasses any and all embodiments within the scope of the following claims.

I claim:

1. A tree and post remover, comprising:

an elongated mounting plate having a front side, a rear side opposite the front side, top and bottom edges, and first and second sides forming lateral ends of the mounting plate;

a fixed jaw assembly extending from the front side of the mounting plate and being disposed adjacent the first side, wherein the fixed jaw assembly includes a jaw member integrally and immovably formed thereto;

a movable jaw assembly being disposed adjacent the second side, the movable jaw assembly being captured within and sliding laterally within the fixed jaw assembly from the second side to the first side, wherein the movable jaw assembly includes a jaw member integrally and immovably formed thereto; and an actuator connected to the movable jaw assembly, the actuator selectively driving the movable jaw assembly laterally relative to the fixed jaw assembly.

2. The tree and post remover according to claim 1, wherein:

the fixed jaw assembly further includes a plurality of fixed jaw members, each of the fixed jaw members being separated by a gap therebetween; and the movable jaw assembly further includes a plurality of movable jaw members, each of the movable jaw members being separated by a gap therebetween, each of the movable jaw members being aligned with a corresponding one of the gaps between the fixed jaw members.

3. The tree and post remover according to claim 1, wherein the actuator is contained within the movable jaw assembly, the actuator further having a first end connected to the movable jaw assembly and a second end opposite the first end, the second end being connected to the fixed jaw assembly.

4. The tree and post remover according to claim 1, wherein:

each of the jaw members has an arcuately concave gripping edge; and each of the gripping edges has a plurality of teeth extending therefrom.

5. The tree and post remover according to claim 1, wherein the actuator comprises a telescoping hydraulic cylinder.

6. The tree and post remover according to claim 1, further including means for removably attaching the mounting plate to a vehicle being disposed upon the rear side of the mounting plate.

7. The tree and post remover according to claim 1, further including an operating vehicle in combination therewith, the operating vehicle having means for the removable attachment of the mounting plate thereon and means for powering the movable jaw assembly.

8. A tree and post remover, comprising:

an elongated mounting plate having a front side, a rear side opposite the front side, top and bottom edges, and first and second sides forming lateral ends of the mounting plate;

a fixed jaw assembly extending from the front side of the mounting plate and being disposed adjacent the first side, wherein the fixed jaw assembly includes a jaw member integrally and immovably formed thereto;

a movable jaw assembly being disposed adjacent the second side, the movable jaw assembly sliding laterally relative to the fixed jaw assembly from the second side to the first side, wherein the movable jaw assembly includes a jaw member integrally and immovably formed thereto; and an actuator connected to the movable jaw assembly, the actuator selectively driving the movable jaw assembly laterally relative to the fixed jaw assembly.

* * * * *